United States Patent [19]

Garvey

[11] 4,129,321
[45] Dec. 12, 1978

[54] SEAT BELT UTILIZATION RECORDER

[75] Inventor: Louis P. Garvey, Birmingham, Mich.

[73] Assignee: General Motors Corporation, Detroit, Mich.

[21] Appl. No.: 831,948

[22] Filed: Sep. 9, 1977

[51] Int. Cl.² .............................................. B62B 35/00
[52] U.S. Cl. ................................ 280/744; 116/114 R; 297/385
[58] Field of Search ............... 280/744, 745, 746, 747; 297/384, 385, 386, 387, 388, 389; 116/114

[56] References Cited

U.S. PATENT DOCUMENTS

| | | | |
|---|---|---|---|
| 3,428,362 | 2/1969 | Bertelson et al. | 297/385 |
| 3,929,351 | 12/1975 | Fricko | 280/744 |

Primary Examiner—Joseph F. Peters, Jr.
Assistant Examiner—Gene A. Church
Attorney, Agent, or Firm—Charles E. Leahy

[57] ABSTRACT

A seat belt anchorage device such as a retractor frame or an apertured plate includes a mounting member having an aperture adapted to receive a fastener for attaching the mounting member on a vehicle body structural member. The mounting member has a slot adjacent the aperture at a spaced relation therefrom to define a land surrounding the aperture, to define a load bearing wall spaced from the land, and define an isthmus integral with the land and extending generally normal to the direction of imposition of the seat belt load on the mounting member. The isthmus has a predetermined load sustaining capability and is permanently deformed upon imposition of an occupant restraining seat belt load greater than the load sustaining capability to provide a permanent record of imposition of an occupant restraining load on the anchorage device. Deformation of the isthmus permits limited bodily shifting movement of the mounting member to carry the load bearing wall into engagement with the land thereby blocking further movement of the mounting member and anchoring the seat belt for restraint of the occupant.

1 Claim, 7 Drawing Figures

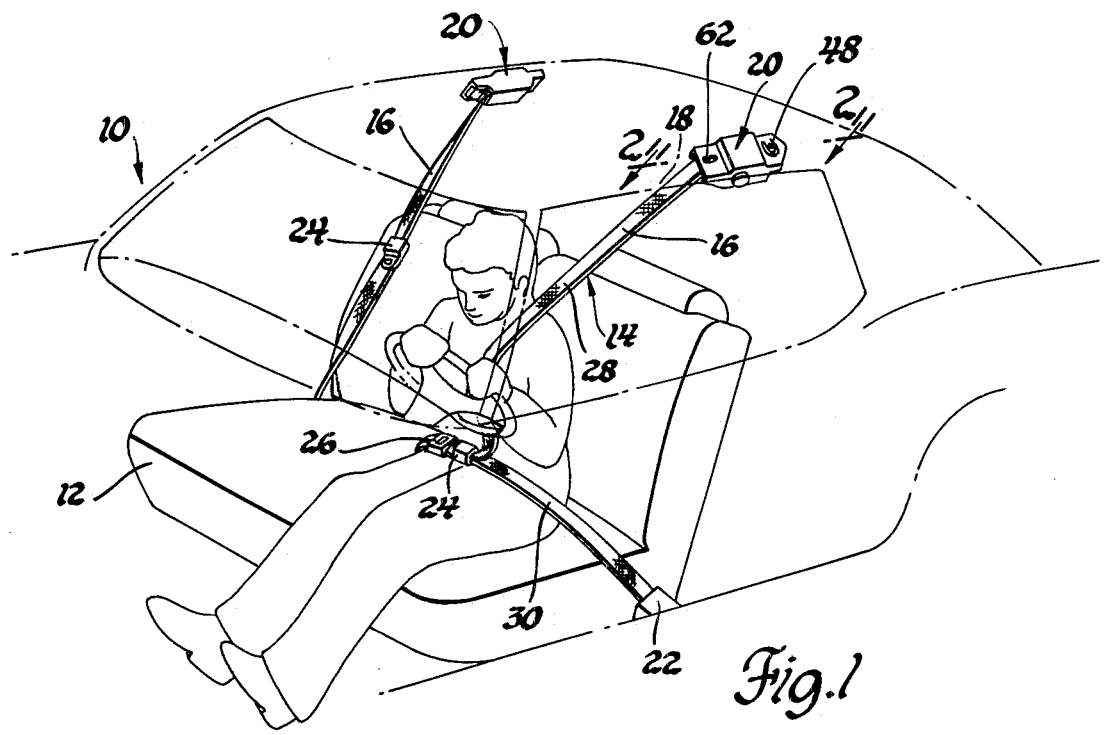
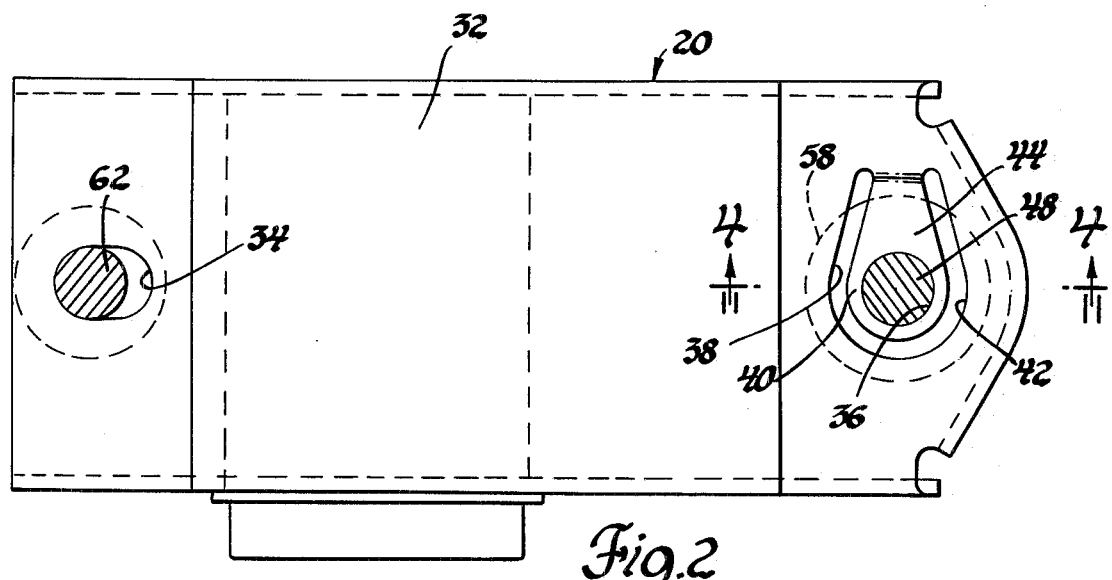
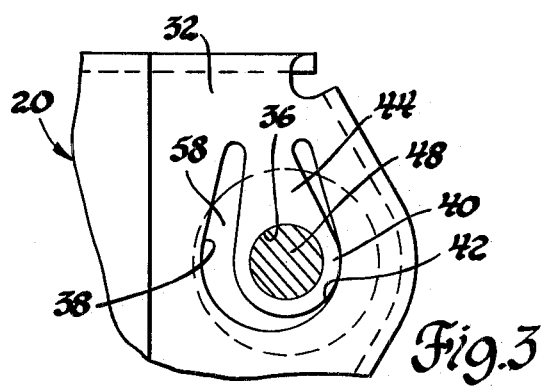
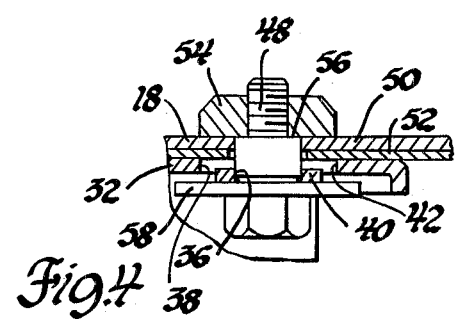

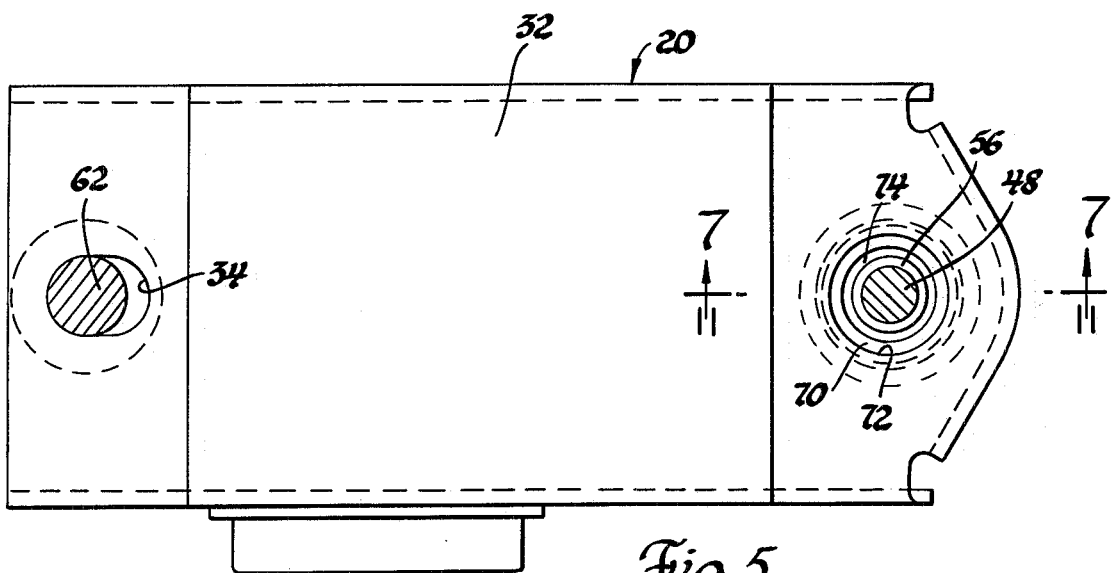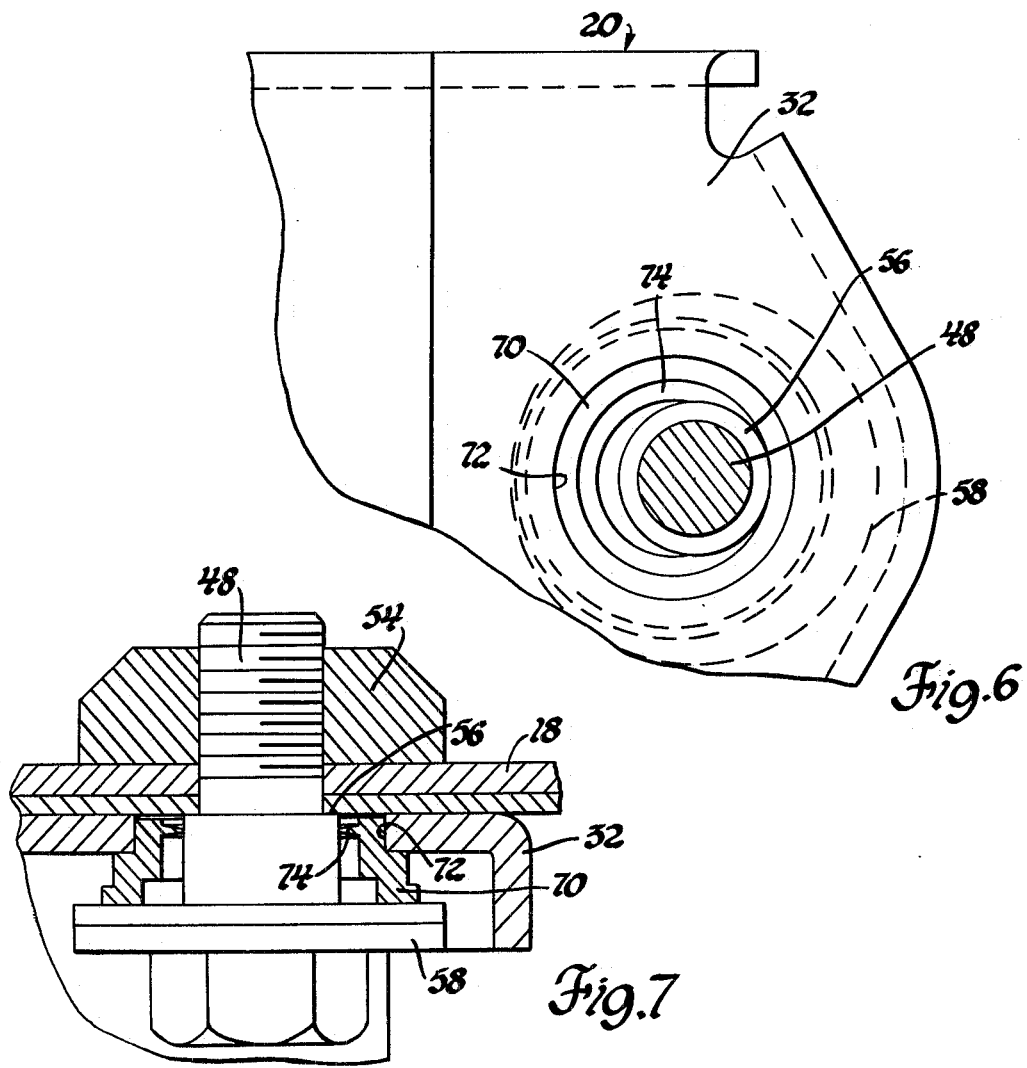

SEAT BELT UTILIZATION RECORDER

The invention relates to an anchorage device for attaching a seat belt on a vehicle body structural member and providing a record of imposition of a predetermined occupant restraint load on the seat belt.

Conventional vehicle occupant restraint belt systems employ a lap belt and/or shoulder belt which are anchored on a structural member of the vehicle body by a retractor which winds and unwinds the belt to a length suited to fit the seated position of a particular occupant. It is desirable in such occupant restraint systems to provide a recording means associated with the belt system by which visual examination will disclose whether the occupant was wearing the seat belt at the time of an emergency calling for restraint of the occupant.

One such seat belt utilization indicator is the subject of U.S. Pat. No. 3,428,362, entitled "Seat Belt Utilization Indicator" and issued to Peter C. Bertelson et al. According to that patent, a seat belt element has a closed loop positioned so that a portion of the loop extends through the aperture in a mounting member secured to a structural element of the vehicle body. Deformable means are positioned in the aperture between the seat belt loop and a sidewall of the aperture whereby the deformable means will be deformed upon a tensioning force being applied to the belt segment as it restrains the body of a vehicle passenger.

A shortcoming of the Bertelson utilization indicator is that it is limited to use in belt systems where a fixed length of belt is attached to the vehicle body by an apertured mounting member. The Bertelson utilization indicator cannot be employed in a seat belt system where the belt is wound and unwound from the spring biased reel of a retractor because the belt end is not looped through an apertured mounting member.

The object, feature and advantage of this invention resides in the provision of a seat belt utilization recorder which may be employed in association with a seat belt retractor or an apertured mounting member.

According to the invention, a seat belt anchorage device such as a retractor frame or an apertured plate includes a mounting member having an aperture adapted to receive a fastener for attaching the mounting member on a vehicle body structural member. The mounting member has a slot adjacent the aperture at a spaced relation therefrom to define a land surrounding the aperture, to define a load bearing wall spaced from the land, and define an isthmus integral with the land and extending generally normal to the direction of imposition of the seat belt load on the mounting member. The isthmus has a predetermined load sustaining capability and is permanently deformed upon imposition of an occupant restraining seat belt load greater than the load sustaining capability to provide a permanent record of imposition of an occupant restraining load on the anchorage device. Deformation of the isthmus permits limited bodily shifting movement of the mounting member to carry the load bearing wall into engagement with the land thereby blocking further movement of the mounting member and anchoring the seat belt for restraint of the occupant.

These and other objects, features and advantages of the invention will become apparent upon consideration of the specification and the appended drawings in which:

FIG. 1 is a perspective view of the vehicle body occupant restraint system embodying the invention;

FIG. 2 is a view of the shoulder belt retractor of the restraint system taken in the direction of arrows 2—2 of FIG. 1;

FIG. 3 is a partial fragmentary view similar to FIG. 2 but showing the retractor after imposition of a load thereon;

FIG. 4 is a sectional view taken in the direction of arrows 4—4 of FIG. 2;

FIG. 5 is a view similar to FIG. 2 showing another seat belt utilization recorder;

FIG. 6 is an enlarged partial fragmentary view of FIG. 5 but showing the shoulder belt retractor after imposition of a seat belt load thereon; and FIG. 7 is a sectional view taken in the direction of arrows 7—7 of FIG. 5.

Referring to FIG. 1, a vehicle body 10 has an occupant seat 12 and a restraint belt system 14 for restraining an occupant in the seat 12. The restraint belt system 14 includes a strap 16 having one end attached to the roof rail 18 of the vehicle body by a shoulder belt retractor 20 and the other end attached to the sill of the vehicle body by an anchor plate 22. A D-ring 24 is slidably engaged on the belt and is engageable in a buckle 26 attached to the vehicle body inboard the occupant to divide the strap 16 into a shoulder belt 28 and a lap belt 30. FIG. 1 also shows an identical occupant restraint belt system at the other side of the vehicle seat for restraining a vehicle passenger and having like numbered elements.

Referring to FIG. 2, it will be understood that the shoulder belt retractor 20 includes a retractor frame 32 on which a belt reel, not shown, is rotatably journalled. The end of strap 16 is attached to the reel for winding thereon by a spring. A pendulum operated lock bar, not shown, is engageable with the reel in response to a predetermined inertia stimulus to block the reel against belt unwinding so that the length of the strap 16 is fixed to restrain the occupant in the seat. The structure and operation of such a shoulder belt retractor is shown in U.S. Pat. No. 3,901,460 entitled "Restraint Belt Retractor with Pendulum Actuated Locking," which is incorporated herein by reference.

The retractor frame 32 has an elongated bolt slot 34 at its forward end and a round bolt aperture 36 at its rearward end. A generally U-shaped slot 38 is provided in the retractor frame 32 and surrounds the aperture 36 to define a land 40 spaced from a wall 42. The U-shaped slot 38 also defines an isthmus 44 which provides an integral connection between the land 40 surrounding aperture 36 and the generally planar surface of the retractor frame 32. As best seen in FIG. 4, a bolt 48 extends through the aperture 36 and through aligned apertures of an inner panel 50 and an outer panel 52 which comprise the roof rail 18. A nut 54 is threadedly engaged on the end of bolt 48 to connect the retractor frame 32 to the roof rail 18. The bolt 48 has a shoulder 56 which spaces the nut 54 from an integral flange 58 of the bolt head. The land 40 of retractor frame 32 is bent out of the plane of frame 32 to bear in spring fashion against the bolt flange 58 and maintain a preload on the nut 54. A similar shoulder bolt 62 extends through the slot 34 at the forward end of retractor frame 32 and a mating aperture of the roof rail 18 and recieves a nut, not shown. The relative spacing between the bolts 48 and 62, the bolt aperture 36, and the bolt slot 34 is as shown in FIG. 2 wherein the bolt 62 is located at the forward end of the slot 34.

Referring again to FIG. 1, it will be understood that the occurrence of a predetermined level of vehicle deceleration during an emergency stop causes the pendulum or like inertia sensing mechanism associated with the retractor 20 to lock the shoulder belt reel against unwinding rotation. The forward momentum of the occupant and the deceleration of the vehicle body result in the imposition of an occupant restraining load on the shoulder belt 28 and lap belt 30. If the occupant restraining load attains a level which exceeds the force sustaining capability of the isthmus 44, the isthmus yields as seen in FIG. 3 to allow limited forward movement of the retractor 20 relative the bolts 48 and 62. As seen in FIG. 3, forward movement of the retractor frame 32 carries the wall 42 of the retractor frame 32 into load bearing engagement with the land 40. The bolt 62 traverses slot 34 and also stops further forward movement. Accordingly, further forward movement of the retractor 20 is prevented and the occupant is restrained in the seat 12.

Referring to FIG. 5, another load recording anchorage device is shown. Those elements which are identical to the first embodiment are identified by like numbers.

Referring to FIGS. 5 and 7, it is seen that a bushing 70, preferably machined from aluminum, is interposed between the shoulder bolt 48 and a round aperture 72 of the retractor frame 32. The bushing 70 includes a thin radial wall 74 which bears on the bolt 48 to establish the normal location of the retractor frame 32 relative bolts 48 and 62. Imposition of an occupant restraint force on the belt and retractor which exceeds the load sustaining capability of the radial wall 74 results in a permanent deformation of the wall 74 and permits bodily forward shifting movement of the retractor 20. Such forward movement of the retractor is limited by engagement of the bolt 62 at the end of slot 34 and also by the engagement of the main body portion of bushing 70 with the bolt 48.

The deformation of the isthmus 44 of the first embodiments or the collapse of the radial wall 74 of the second embodiment provide a permanent record of the occurrence of an occupant restraining load on the belt system. The embodiment of FIGS. 1-4 has the advantage of being economical of manufacture because the structure is formed integrally with the retractor housing and no additional parts are required in addition to those normally and conventionally required in the mounting of a seat belt retractor. The deformable aluminum bushing 70 of the embodiment of FIGS. 5-7 has the advantage of being easily replaced to record subsequent load impositions on the retractor.

It will be understood that this invention may be utilized in conjunction with either a belt retractor or an apertured mounting member and may be mounted on any suitably located structural member of the vehicle body.

The embodiments of the invention in which an exclusive property or privilege is claimed are defined as follows:

1. An anchorage device for attaching a seat belt on a vehicle body structural member and for providing a record of imposition of a predetermined occupant restraint load on the seat belt, said anchorage device comprising: a seat belt mounting member having the seat belt attached thereto; said mounting member having a generally planar surface having an aperture adapted to receive a fastener for attaching the mounting member on the structural member; said mounting member having a slot adjacent the aperture at a spaced relation therefrom to define a land surrounding the aperture, a load bearing wall spaced from the land, and an isthmus integral with the land and the generally planar surface and extending generally normal to the direction of seat belt load imposition on the mounting member; said isthmus having a predetermined limited load sustaining capability and being permanently deformed upon imposition of an occupant restraint seat belt load greater than the predetermined load sustaining capability of the isthmus to provide a permanent record of imposition of an occupant restraining load on the anchorage device and permit limited bodily shifting movement of the mounting member whereby the load bearing wall is carried into engagement with the land to block further movement of the mounting member and thereby anchor the seat belt for restraint of the occupant.

* * * * *